Figure 1A:
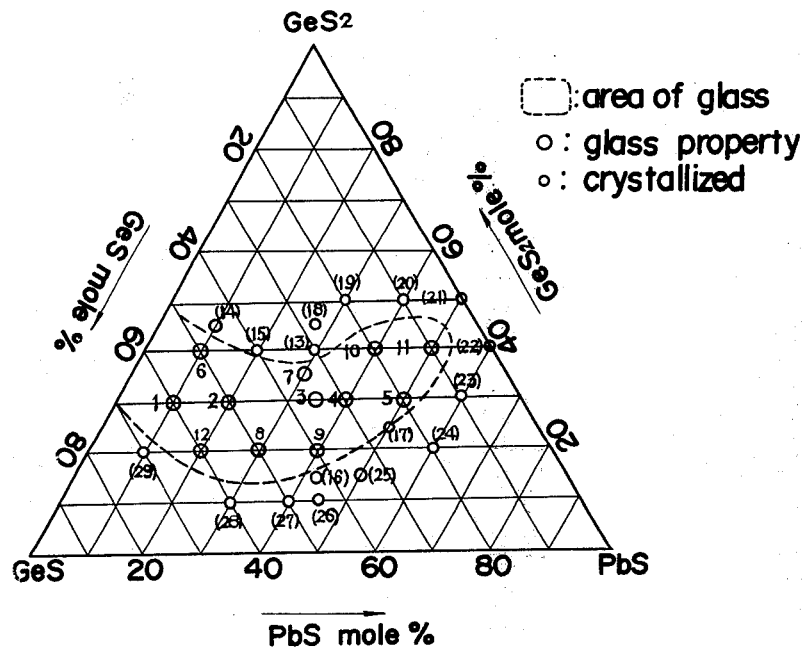

United States Patent [19]

Inoue et al.

[11] 3,962,141
[45] June 8, 1976

[54] VITREOUS PHOTOCONDUCTIVE MATERIAL

[75] Inventors: Masayoshi Inoue, Sakai; Shoji Tsuchihashi; Yoji Kawamoto, both of Kobe, all of Japan

[73] Assignee: Minolta Camera Kabushiki Kaisha, Osaka, Japan

[22] Filed: Apr. 22, 1974

[21] Appl. No.: 463,178

[30] Foreign Application Priority Data
Apr. 24, 1973    Japan................................ 48-47005

[52] U.S. Cl..................................... 252/501; 96/1.5
[51] Int. Cl.².......................................... H01L 31/00
[58] Field of Search ................ 252/501, 518; 96/1.5

[56] References Cited
OTHER PUBLICATIONS

"Glasbildung im System SnS–GeS–GeS₂ und die Mossbauer–Spektren der Glaser," Anorg. Alleg. Chemie 403, 243–250 (Feb. 1974).
"Glass–Forming Regions and Structure of Glasses in the System Ge–S," J. Amer. Ceramic Soc., vol. 52, No. 11, pp. 626–627.

Primary Examiner—Benjamin R. Padgett
Assistant Examiner—E. Suzanne Parr
Attorney, Agent, or Firm—Wenderoth, Lind & Ponack

[57] ABSTRACT

Vitreous photoconductive material having a composition $xGeS_2$—$yGeS$—$zMS$, which does not contain arsenic, but has good thermal stability.

1 Claim, 6 Drawing Figures

VITREOUS PHOTOCONDUCTIVE MATERIAL

The present invention relates to a vitreous photoconductive material, and more particularly to a vitreous photoconductive material having a $GeS_2$—$GeS$—$MS$ composition, where M is a metal other than germanium in Group IVa of the periodic table.

Photoconductive materials currently in general use may be classed as two broad types, one type being a bonded type comprising a dispersion of fine crystals of compounds such as ZnO, CdS, CdSe in a binder constituted by a vitreous substance, or a high polymer substance having dielectric properties, and the other type being a planar type comprising a vitreous selenium base supporting a vacuum-evaporated film of photosensitive organic semiconductor material, or vitreous semiconductor material, suitably doped to improve heat resistance properties and sensitivity to light. Both these types of conventional photoconductive material have good dark resistances, have ability to hold charges, and provide suitable photo-conductances when exposed to light. However, in electrophotographic processes, non-crystalline material is generally preferred, since it is superior electrically, in that it has high insulation resistance, and is not unduly sensitive to small quantities of impurities. Furthermore because it has a broader spectral response than crystalline substances, it is more easily worked, and is practically unaffected by ambient conditions such as humidity, and, since evaporated films employed do not have a granular structure, it is possible to obtain better resolution of images. There is known and employed a variety of vitreous photoconductive materials, which may be, for example, selenium alone, or forming compounds with tellurium, arsenic, tin, or with arsenic together with a halogen. Of these various compounds, Se—As compounds are generally considered superior, because of their greater stability at higher temperatures.

However, arsenic and its compounds being highly toxic, special measures must be taken in the production of photoconductors containing arsenic, in order to protect personnel, and there are also problems of disposal of waste.

Accordingly, an essential object of the present invention is to provide a vitreous photoconductive material that does not contain arsenic, but has good thermal stability. The research in this direction was carried out on the basis of the knowledge that a metallic chalcogen compound together with a germanium-chalcogen glass having a suitable composition range can form an extremely stable glass, and that if the metallic chalcogen compound employed has inherent photoconductive properties, the glass obtained also has photoconductive properties.

As a result of the research, there is provided, according to the present invention, a vitreous photoconductive material having a composition of the general formula $xGeS_2$—$yGeS$—$zMS$, where M is a metal other than germanium in Group IVa of the periodic table, $x$, $y$, and $z$ represent mole percentages, and $x+y+z=100$. If M is lead, then $15<x<50$, $5<y<70$, $0<z<55$, and if M is tin, then $20<x<50$, $15<y<70$, $0<z<55$. The distribution of composition of material according to the invention is indicated by the areas under the dotted lines of FIG. 1a and FIG. 1b of the attached drawings. It was found that compositions lying outside the areas under the dotted lines of FIG. 1a and FIG. 1b result in solids that are completely or partially crystalline, and so do not satisfy the objects of the invention.

Figure 1B:
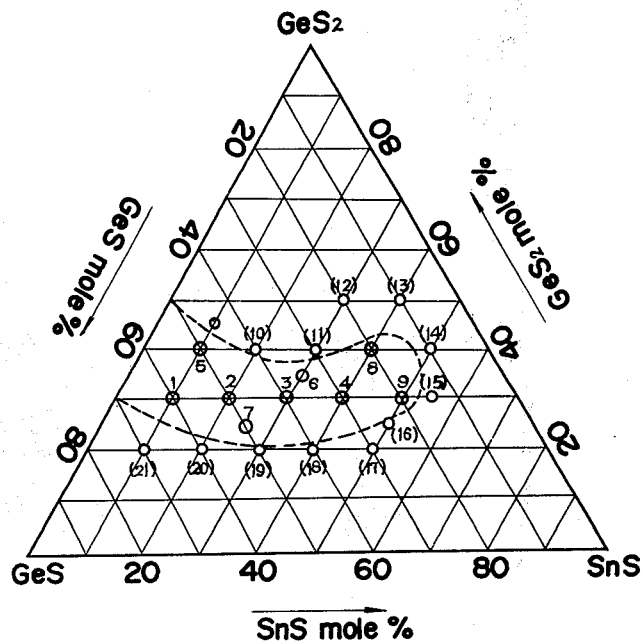
Figure 2A:
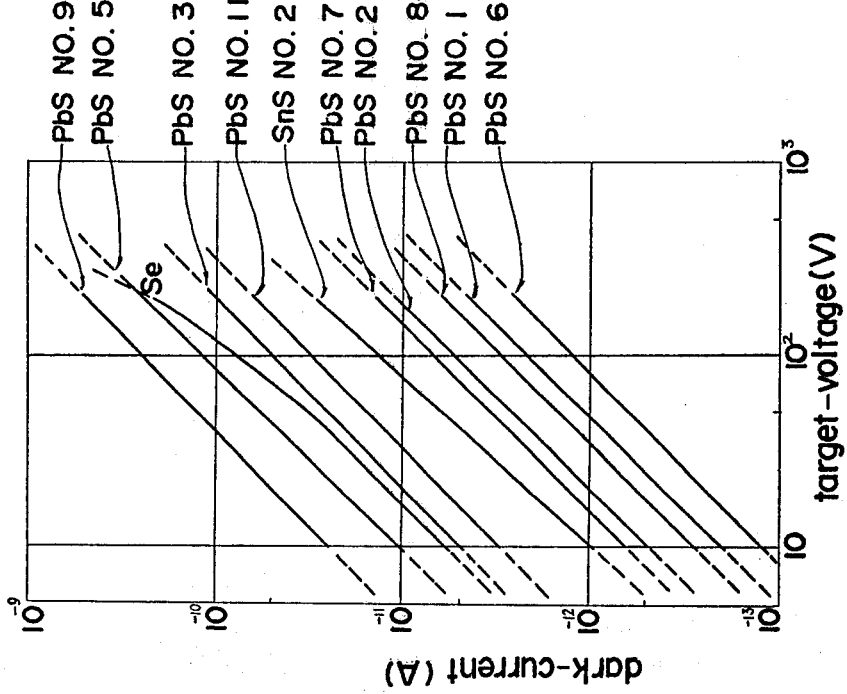
Figure 2B:
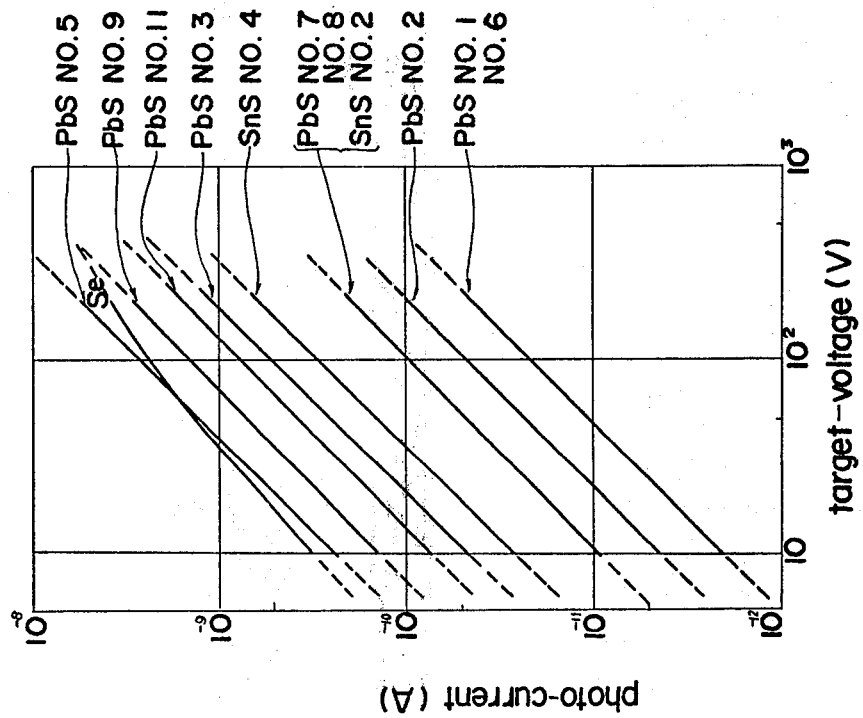
Figure 4:
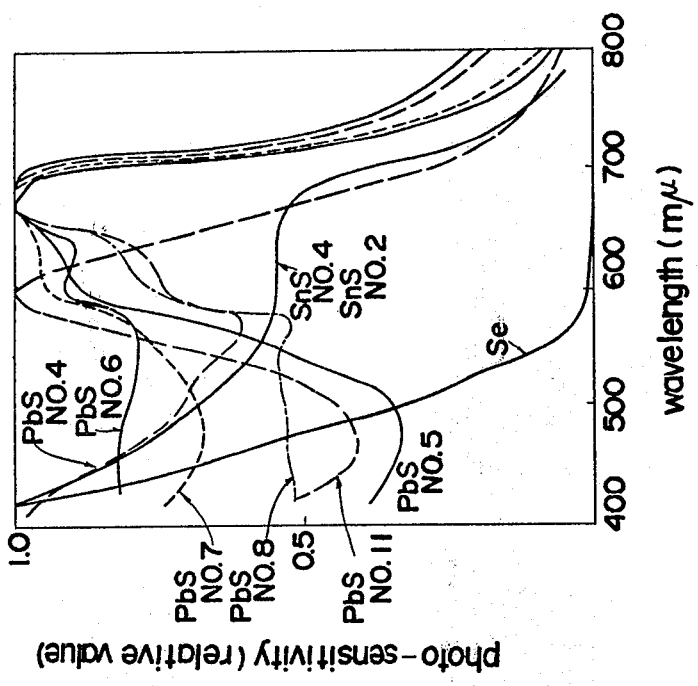
Figure 3:
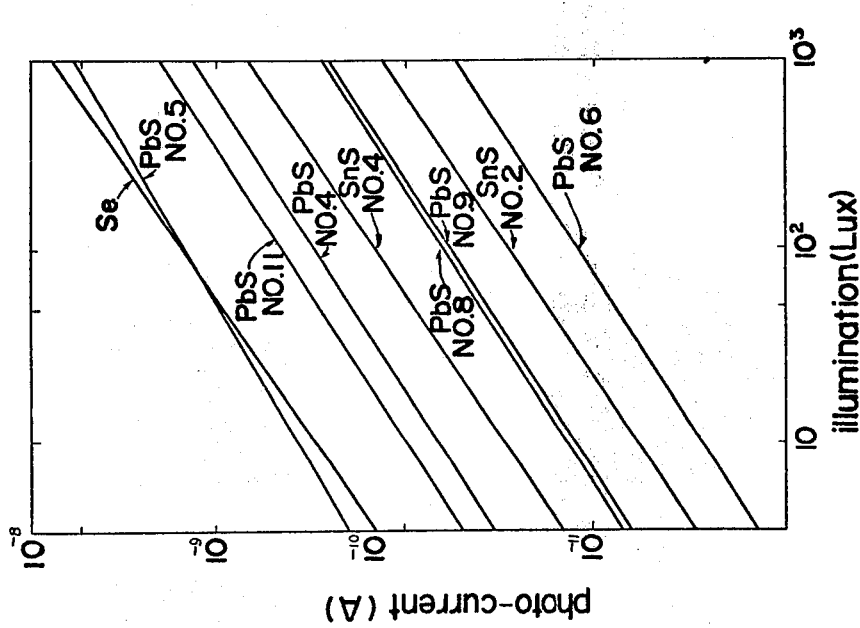

A better understanding of the present invention may be obtained from the following full description, when read in conjunction with the attached drawings, in which;

FIG. 1a is a $GeS_2$—$GeS$—$PbS$ phase diagram indicating the composition range in which vitreous material according to the invention is obtained, FIG. 1b is a $GeS_2$—$GeS$—$SnS$ phase diagram indicating the composition range in which vitreous material according to the invention is obtained, and FIGS. 2 through 4 show to results of tests on samples of material according to the invention, in which FIG. 2a is a graph of photocurrent versus applied voltage under a constant illumination of 80 lux, FIG. 2b is a graph of dark current versus applied voltage, FIG. 3 is a graph of photocurrent versus illumination with a constant applied voltage of 50V, and FIG. 4 is a graph of spectral response wherein maximum photocurrent of each sample is taken as 1, and ordinate values are relative to this maximum value.

The invention will now be described in reference to various examples.

EXAMPLES 1 – 29

Base materials employed were germanium, sulphur, and lead, which were weighed into various quantities, to obtain samples with the compositions indicated for Sample Nos. PbS1 – PbS29, in Table 1 below. The samples having these various compositions were then prepared as follows. Each sample mixture was put into a mica ampoule, which had been throughly washed and dried. Gas was then evacuated from the ampoule interior, to bring the pressure in the ampoule to below $10^{-3}$ Torr, and the ampoule was sealed, the sample mixture thus being vacuum-sealed in the ampoule. Next, the ampoule and sample mixture were put into a tube furnace, and heated and allowed to react therein, while being oscillated in a see-saw motion having a frequency of five swings per minute.

The times for which different samples were maintained in a tube furnace were varied from 5 to 10 hours, and furnace temperatures were in the range 800°–1000°C. After this treatment, ampoules containing the molten samples were withdrawn from the furnace, and brought to room temperature by slow cooling in air, or by quenching in water, after which the solidified samples were taken out of the ampoules and examined, both macroscopically and by polarizing microscope, to determine whether the substances obtained were crystalline or non-crystalline. In Table 1, compositions resulting in vitreous solids are identified by asterisks thus: PbS1*, 2*, etc. These compositions lie in the area under the dotted line of FIG. 1a, wherein samples are identified by the same numbers as in Table 1.

Table 1

| Sample No. | Proportion by Weight(g) | | | $GeS_2$-$GeS$-$PbS$ mole % | | |
|---|---|---|---|---|---|---|
| | Ge | S | Pb | $GeS_2$ | GeS | Pb |
| PbS1* | 13.066 | 8.336 | 4.144 | 30 | 60 | 10 |
| 2* | 11.614 | 8.336 | 8.288 | 30 | 50 | 20 |
| 3* | 8.432 | 7.924 | 12.690 | 30 | 35 | 35 |
| 4* | 7.622 | 7.294 | 14.503 | 30 | 30 | 40 |
| 5* | 5.444 | 6.252 | 15.539 | 30 | 20 | 50 |
| 6* | 13.066 | 8.977 | 4.144 | 40 | 50 | 10 |
| 7* | 8.892 | 7.574 | 12.690 | 35 | 35 | 30 |
| 8* | 8.892 | 6.733 | 10.877 | 20 | 50 | 30 |

Table 1-continued

| Sample No. | Proportion by Weight(g) Ge | S | Pb | GeS$_2$-GeS-PbS mole % GeS$_2$ | GeS | Pb |
| --- | --- | --- | --- | --- | --- | --- |
| 9* | 7.622 | 6.733 | 14.503 | 20 | 40 | 40 |
| 10* | 7.622 | 7.855 | 14.503 | 40 | 20 | 40 |
| 11* | 4.537 | 5.611 | 12.949 | 40 | 10 | 50 |
| 12* | 11.614 | 7.694 | 8.288 | 20 | 60 | 20 |
| 13 | 8.892 | 7.855 | 10.877 | 40 | 30 | 30 |
| 14 | 13.066 | 9.297 | 4.414 | 45 | 45 | 10 |
| 15 | 11.614 | 8.977 | 8.288 | 40 | 40 | 20 |
| 16 | 7.252 | 6.452 | 15.410 | 15 | 42.5 | 42.5 |
| 17 | 5.444 | 6.011 | 15.539 | 25 | 25 | 50 |
| 18 | 7.894 | 6.973 | 8.547 | 45 | 27.5 | 27.5 |
| 19 | 7.622 | 7.214 | 9.324 | 50 | 20 | 30 |
| 20 | 6.533 | 7.214 | 12.431 | 50 | 10 | 40 |
| 21 | 5.444 | 7.214 | 15.539 | 50 | 10 | 40 |
| 22 | 4.355 | 6.733 | 18.647 | 40 | 0 | 60 |
| 23 | 4.355 | 6.252 | 18.647 | 30 | 10 | 60 |
| 24 | 4.355 | 5.771 | 18.647 | 20 | 20 | 40 |
| 25 | 5.444 | 5.530 | 15.539 | 15 | 35 | 50 |
| 26 | 5.989 | 5.290 | 13.985 | 10 | 45 | 45 |
| 27 | 6.533 | 5.290 | 12.431 | 10 | 50 | 40 |
| 28 | 7.622 | 5.290 | 9.324 | 10 | 60 | 30 |
| 29 | 13.066 | 7.694 | 4.144 | 10 | 70 | 20 |

Notes:
Sample Nos. 1* – 9* were air-cooled and resulted in vitreous substances.
Sample Nos. 10* – 12* were quenched in water and resulted in vitreous substances.

Sample Nos. 13 – 17 were quenched in water and resulted in vitreous substances, but with surface precipitation of crystals.
Sample Nos. 18 – 29 resulted in crystalline solids.

EXAMPLES 30–50

In these examples, samples were prepared, treated, and examined in the same manner as for Examples 1–29, but the base materials employed were germanium, sulphur, and tin. The samples prepared in Examples 30–50 are identified as Sample Nos. SnS1–SnS21 in Table 2, which shows proportions of the various base materials in different samples. In Table 2, compositions resulting in a vitreous solid are identified with an asterisk thus: SnS1*. These compositions, identified by the same numbers, lie in the area under the dotted line of FIG. 1b.

Table 2

| Sample No. | Proportion by Weight(g) Ge | S | Sn | GeS$_2$-GeS-SnS mole % GeS$_2$ | GeS | Sn |
| --- | --- | --- | --- | --- | --- | --- |
| SnS1* | 9.466 | 8.492 | 2.374 | 30 | 60 | 10 |
| 2* | 8.414 | 8.492 | 4.748 | 30 | 50 | 20 |
| 3* | 7.226 | 8.492 | 7.121 | 30 | 40 | 30 |
| 4* | 6.311 | 8.492 | 9.495 | 30 | 30 | 40 |
| 5* | 9.486 | 9.145 | 2.374 | 40 | 50 | 10 |
| 6* | 7.363 | 8.818 | 7.121 | 35 | 35 | 30 |
| 7* | 7.889 | 8.165 | 5.935 | 25 | 50 | 25 |
| 8* | 6.311 | 9.145 | 9.495 | 40 | 20 | 40 |
| 9* | 5.259 | 8.492 | 11.869 | 30 | 20 | 50 |
| 10 | 8.414 | 9.145 | 4.748 | 40 | 40 | 20 |
| 11 | 7.363 | 9.145 | 7.121 | 40 | 30 | 30 |
| 12 | 7.363 | 9.798 | 7.121 | 50 | 20 | 30 |
| 13 | 6.311 | 9.798 | 9.495 | 50 | 10 | 40 |
| 14 | 5.259 | 9.145 | 11.869 | 40 | 10 | 50 |
| 15 | 4.733 | 8.492 | 13.055 | 30 | 15 | 55 |
| 16 | 5.259 | 8.165 | 11.869 | 25 | 25 | 50 |
| 17 | 5.259 | 7.838 | 11.869 | 20 | 30 | 50 |
| 18 | 6.311 | 7.838 | 9.495 | 20 | 40 | 40 |
| 19 | 7.363 | 7.838 | 7.121 | 20 | 50 | 30 |
| 20 | 8.414 | 7.838 | 4.748 | 20 | 60 | 20 |
| 21 | 9.466 | 7.838 | 2.374 | 20 | 70 | 10 |

Notes:
Sample Nos. 1* – 7* were air-cooled and resulted in vitreous solids.
Sample Nos. 8*, 9* were quenched in water and resulted in vitreous solids.
Sample No. 10 was quenched in water and resulted in a vitreous solid, but with surface recipitation of crystals.
Sample Nos. 11 – 21 resulted in crystalline solids.

Subsequently, series of tests, numbered 1 through 9, were carried out on those samples forming vitreous solids, i.e., Sample Nos. PbS1*–PbS12* and Sample Nos. SnS1*–SnS9*.

Tests 1 through 4 were carried out to assess the general electrical properties of material according to the invention. Tests 5 through 9 were carried out to assess the suitability of the material for use in electrophotographic processes.

Initial preparation for Tests 1–4 was as follows.

Portions of the various vitrified samples were taken and polished, by the same general means and in the same general manner as for optical glass, to produce mirror surfaces onto which arch-shaped electrodes of aluminium were evaporated, the spacing between electrodes on each sample being 0.2 mm, and the light-receiving area of each sample being approximately 0.1 cm$^2$. Leads were attached to the aluminium electrodes, there thus being formed, for each sample, a photoconduction metering cell, which was employed in the following tests.

TEST 1

This test was carried out to determine the dependence of dark current and photocurrent on target (light sensing surface) voltage. Different voltages were imposed on each metering cell by a fixed voltage unit (DC Supply Unit hp6515A, manufactured by Yokogawa-Hewlett-Packard Co. of Japan), and current was measured by an ammeter (Picoammeter TR-8641, manufactured by Takeda Research Co. of Japan) in series with the metering cell. In measuring photo-current, each sample was irradiated by means of a white light tungsten lamp, the amount of illumination being 80 lux.

The results obtained for different samples in Test 1 are plotted, together with characteristic curves for conventional vitreous selenium, in FIG. 2a and FIG. 2b, which are graphs of photo-current and dark-current, respectively, versus target voltage. From these results it is clear that certain of the samples having a GeS$_2$—GeS—Pbs composition according to the invention, for example, Sample No. PbS5*, have a sensitivity to white light closely approximating that of selenium.

TEST 2

In this test, target voltage in each cell was maintained at 50V, and variations of current at different values of illumination were determined, illumination being varied by means of an ND filter. Results obtained are plotted in the graph of FIG. 3.

TEST 3

This was a test to determine the spectral response of each sample. The source of radiation was a tungsten lamp emitting a monochromatic white light which was passed through an interference filter.

The results of Test 3 are shown in FIG. 4, from which it may be seen that GeS$_2$—GeS—PbS compositions are sensitive to radiation over the entire wavelength range of visible light, and have peak sensitivity in the 600mu–700mu range.

TEST 4

Each sample was held at 100°C for 5 hours in a thermostatic chamber, and then cooled to room temperature, after which Test 1 was repeated. No significant changes of values of dark-current or photo-current were found.

Tests 1 through 4 showed that vitreous material having a composition according to the invention has the advantages that its dark resistance is equivalent to or greater than that of vitreous selenium conventionally employed, that its photoconductive characteristics are close to those of vitreous selenium, and that there is no fear of dielectric breakdown upon imposition of high voltages on the material.

Initial preparation for Test 5 was as follows.

Each sample was used in the production of a photosensitive plate such as normally employed in electrophotography, the procedure in each case being to sputter the sample, to form a film 50μ thick, on an aluminium substrate, in an evaporation chamber in which the pressure was $10^{-5}$ Torr. The plates produced were then tested as follows.

TEST 5

Each photosensitive plate was employed in a normal electrophotographic process, wherein the plate surface was charged to −500V by a corona charging unit, and then exposed to an image, under an illumination of 10 lux/sec, provided by a white light tungsten lamp. Subsequently, the plate surface was dusted with dry, positively charged toner particles, by means of a magnetic brush, in a conventionally known manner.

In all cases, images having good resolution and good density were obtained.

In tests 6 – 9, initial preparation of each sample was as follows.

A portion of the sample was ground to produce particles less than 400 mesh, which were then mixed in a 5:1 ratio by weight in a two-part epoxy binding agent (for example, Diabond 2100E of trade name in Japan). The mixture was allowed to react and solidify to a paste which was applied by Knife edge technique on an aluminium substrate to form a film 40μ thick. The film was then hardened, thus producing a photosensitive plate. For each sample, the photosensitive plate thus produced was divided into four portions, a separate one of which was used in each of the Tests 6 through 9.

TEST 6

For each sample, a portion of the divided plate was charged to +400V by a corona charging unit, then exposed to an image, under illumination of 15 lux/sec. provided by a white light tungsten lamp, after which dry, negatively-charged toner particles were dusted onto the exposed surface to develop the image thereon.

TEST 7

In this test the procedure was the same as in Test 6, except that photosensitive plate portions were charged to −400V and positively charged toner particles were used for image development.

TEST 8

A portion of the photosensitive plate produced with each sample was held at 100°C for 5 hours in a thermostatic chamber, and then cooled to room temperature, after which Test 6 was repeated.

TEST 9

The remaining portion of each photosensitive plate was held at 100°C for 5 hours, and then cooled to room temperature, after which Test 7 was repeated.

In each of tests 6 through 9, all the photosensitive plates produced images having good resolution and good density.

As is clear from the above description, the present invention provides a vitreous photoconductive material which may be employed in the same manner as selenium in evaporation techniques, which possesses high dark resistance, broad spectral response, and thermal stability comparable with that of selenium, and which displays practically no changes in characteristics when employed in the form of a powder. Thus the material of the invention may be easily and effectively employed in the same manner as conventional vitreous photosensitive semiconductor materials, for example, in photosensitive plates used in electrophotography, or in light sensor elements in vidicon or other camera tubes. The material according to the invention has the particular advantage that, while having the above-cited properties, it does not present the problems and risks associated with conventional materials, since, unlike conventional materials, such as Se—As compounds, it is not highly toxic, and if M is tin, there is practically no risk at all associated with the material of the invention. Also, it is to be noted that compositions lying outside the areas under the dotted lines of FIG. 1a and FIG. 1b result in solids that are completely or partially crystalline, and so do not satisfy the objects of the present invention.

What is claimed is:

1. Vitreous photoconductive material having a composition of the formula $x\text{GeS}_2$—$y\text{GeS}$—$z\text{MS}$, where M is a metal other than germanium in Group IVa of the Periodic Table, $x$, $y$ and $z$ represent mole percentages, and $x+y+z=100$, $x$, $y$ and $z$ having numerical values in the ranges $15<x<50$, $5<y<70$, $0<z<55$ when M is lead and in the ranges $20<x<50$, $15<y<70$, $0<z<55$ when M is tin.

* * * * *